(12) United States Patent
Chang

(10) Patent No.: US 8,235,573 B2
(45) Date of Patent: Aug. 7, 2012

(54) BACKLIGHT MODULE

(75) Inventor: Chih-Li Chang, Taipei (TW)

(73) Assignee: Hannstar Display Corp., Taipei (TW)

( * ) Notice: Subject to any disclaimer, the term of this patent is extended or adjusted under 35 U.S.C. 154(b) by 148 days.

(21) Appl. No.: 12/716,675

(22) Filed: Mar. 3, 2010

(65) Prior Publication Data
US 2010/0259948 A1 Oct. 14, 2010

(30) Foreign Application Priority Data
Apr. 9, 2009 (TW) ................................ 98111901 A

(51) Int. Cl.
*F21V 7/04* (2006.01)
(52) U.S. Cl. .................... 362/610; 362/612; 362/616
(58) Field of Classification Search .............. 362/608, 362/610, 611, 612, 613, 615, 616, 617, 619, 362/621, 622, 628, 330, 331, 332
See application file for complete search history.

(56) References Cited

U.S. PATENT DOCUMENTS

| 7,171,104 B2 * | 1/2007 | Tamura et al. | 362/610 |
| 7,661,865 B2 * | 2/2010 | Baba | 362/610 |
| 7,728,923 B2 * | 6/2010 | Kim et al. | 362/613 |
| 2005/0213346 A1 * | 9/2005 | Kao et al. | 362/613 |
| 2006/0285356 A1 * | 12/2006 | Tseng | 362/608 |

FOREIGN PATENT DOCUMENTS

| JP | 2006331658 | | 7/2006 |
| TW | 200736723 A | * | 10/2007 |

* cited by examiner

*Primary Examiner* — Y My Quach Lee
(74) *Attorney, Agent, or Firm* — Volpe and Koenig, P.C.

(57) ABSTRACT

A backlight module includes a light guide, a mixing light guide plate, and a plurality of light sources. The first light guide comprises a first side surface. The mixing light guide plate comprises an incident surface with anomalous surface and an emergent surface with fog surface. The mixing light guide plate is set on the first side surface. A plurality of light sources disposed corresponding to the incident surface, with light emitted there from and entering the mixing light guide plate through the incident surface then exits the mixing light guide plate through the emergent surface, finally, entering the light guide through the first side surface.

15 Claims, 4 Drawing Sheets

BACKLIGHT MODULE

FIELD OF THE INVENTION

The present invention mainly relates to a backlight module, particularly to a backlight module applied in a liquid crystal display device.

BACKGROUND OF THE INVENTION

In recent years, the products using the liquid crystal display (LCD) has become very popular, such as notebook computers, monitors, mobile phones cameras, LCD TVs, digital cameras and personal digital assistants (PDA), etc. Their applications can be easily found everywhere. Since the LCD cannot luminesce itself, the function of the backlight module is to provide the light source, which can provide sufficient brightness and uniform light distribution on the LCD panel. Therefore, the backlight module is actually inevitable equipment for the LCD products. Furthermore, the backlight module will still be a suitable choice in the other applied field of luminescent requirement even if it is not applied to the LCD products.

Traditionally, liquid crystal displays use the Cold Cathode Fluorescent Tube (CCFT) as their backlight light source, which emits white light. Since the CCFT with small diameter is very difficult to manufacture, the CCFT is restricted to be applied in liquid crystal display device of small electronic products. Moreover, the CCFT also has some drawbacks of high voltage requirement, large power consumption, electromagnetic interference and other environmental protection issues caused by the use of mercury.

Therefore, the light Emitting Diode (LED) has been developed as the backlight light source of the LCD. The LED backlight light source module can generally be divided into two types. One type is using a white LED as the backlight light source, but the cost of the white light LED is high, and the other type is using the LED of red, green and blue (RGB) colors as the backlight light source, which mixes the primary colors red, green and blue light emitted by the RGB tri-color LED and then produces the white light. When the RGB tri-color LED is used as the backlight light source, the backlight module of the LCD needs additional optical components or extra space to mix red, green and blue light.

The LED light source will have a great help for the LCD products because the light-emitting efficiency of LED has been dramatically improved. It is generally believed that the LED at the present stage has already possessed about half of efficiency of the CCFT. Even by year 2010, the LED light-emitting efficiency is expected to keep pace with the CCFT, of course, which is just in terms of brightness on the LED.

If the high response rate of the LED characteristics is applied, so as to sequentially light up the red, blue and green LED light source with high-speed switching, which is capable to not only replace high-priced color filters in the LCD panel, but also enhance color saturation and brightness of the liquid crystal display products. In view of this, the impact of future developing trends of LED light source for LCD display products will be comprehensive and thorough. In addition to the application in the liquid crystal display products, once the LED light-emitting performance is competitive to (or exceed) CCFT, their application would then be more extensive. For example, LED light is now used in many signal sources, such as traffic signals and the turn signals of cars. If the LED luminous performance makes further progress, the most likely application is to extend to the illumination light source. The LED which has the low power consumption and low-heating characteristics will bring a huge threat to the entire present lighting source.

FIG. 1 is a cross-section diagram of the conventional LED backlight system. As shown in FIG. 1, the backlight system includes plural light sources 10, a reflector 11, a mixing light guide plate 12, a mirror 13 and a main light guide plate 14. Among them, the light source 10 is configured in a row, and the light source 10 includes RGB tri-color LED. One LED is showed in the cross-section diagram of FIG. 1. The red, green and blue lights emitted from the light source 10 reflect to the mixing light guide plate 12 via the reflective mirror 11. Then, the red, green and blue lights change their direction through the reflective surface of the mixing light guide plate 12. Thus, the red, green and blue lights can be fully mixed into the white light by changing their direction in the mixing light guide plate 12. Then, the mixed white light is emitted by the mixing light guide plate 12 and reflected to the main light guide plate 14 via the reflective mirror 13. The mixed white light is transferred into the surface light source by the main light guide plate 14, and then, the mixed white light is sent to the optical components of the back-end and finally to the LCD panel.

However, in the above-mentioned prior art, due to the characteristic of light straight transmission, the light direction won't be changed until the light come into contact with the reflective surface of the mixing light guide plate 12. Therefore, if red, green and blue lights need to be fully mixed, the length of the mixing light guide plate 12, which is the path of the mixing light, must be long enough.

Based on the above description of the prior art, the LED backlight module needs a good light mixing mechanism to render the LED backlight module providing a uniform color mixing and brightness. However, the light mixing mechanism provided by the conventional LED backlight module as shown in FIG. 1 still has to be improved. In addition, while providing the LED backlight module with a better light mixing mechanism, it still has to consider the LED is a directional component, so as to avoid lowering the overall luminous efficiency of the LED backlight module while achieving a good light mixing effect.

Accordingly, it still lacks a LED backlight module having both light-emitting efficiency and mixing light effectiveness to overcome the imperfect shortcoming of light mixing effect in prior art. And the newly developed technology is expected to not only improve the mixing light effect, but also be quickly and easily integrated into the existing manufacturing process of the LED backlight module for facilitating the competitiveness of the industry in cost and other aspects.

Thus, the R & D personnel engaged in the related fields of the LED backlight modules are devoted to solve the shortcomings that still existed in the prior art, and further improve the quality of the LED backlight module products.

SUMMARY OF THE INVENTION

The main purpose of the present invention is to provide a backlight module with better light mixing effect. Another purpose of the present invention is to provide a backlight module that can be quickly integrated into the existing manufacturing process of the backlight module.

The backlight module provided by the present invention includes a light guide plate, a mixing light guide plate and a plurality of light sources. The light guide plate has a first side surface. The mixing light guide plate has an incident surface with an anomalous surface and an emitting surface with a foggy surface. The mixing light guide plate is disposed on the first side surface of the light guide plate. A plurality of light sources disposed corresponding to the incident surface. The light emitted from the light source enters the mixing light guide plate through the incident surface, and then exits the mixing light guide plate through the emitting surface, and entering the light guide plate through the first side surface.

The present invention provides a LED backlight module having both the luminous efficiency and the light mixing effect. The present invention provides a backlight module with a mixing light guide plate, having a good light mixing effect and overcoming the drawback of the inefficient luminescence of the conventional LED backlight module. Furthermore, the new technologies developed by the present invention provide excellent convenience in manufacturing, which can be quickly integrated into the existing producing process of the backlight module. Therefore, the present invention not only meets the industrial consideration on the cost and manufacturing, but also has a great progressiveness, which will facilitate the enhancement of industrial competitiveness.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. Besides, the present invention also can be broadly implemented in other embodiments, that is, the scope protected in the present invention will not be limited to the disclosed embodiment, which should be accorded with the broadest interpretation of the appended claims.

Furthermore, in order to provide a clearer description and easier to understand the present invention, each parts in the Figures are not drawn in accordance with their relative size. Some sizes in comparison with other relevant scales have been exaggerated. In order to keep concise, irrelevant details are not completely drawn.

Figure 1:
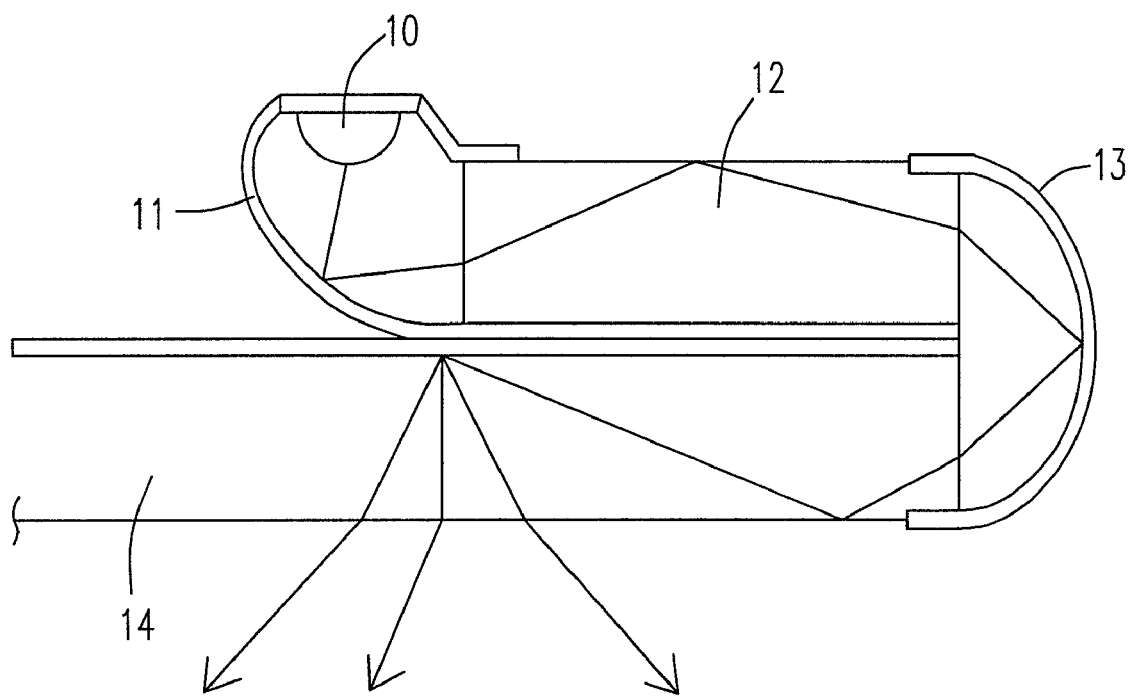
FIG. 1 shows a cross-section diagram of a conventional connecting process between an IC chip and a glass substrate.
Figure 2:
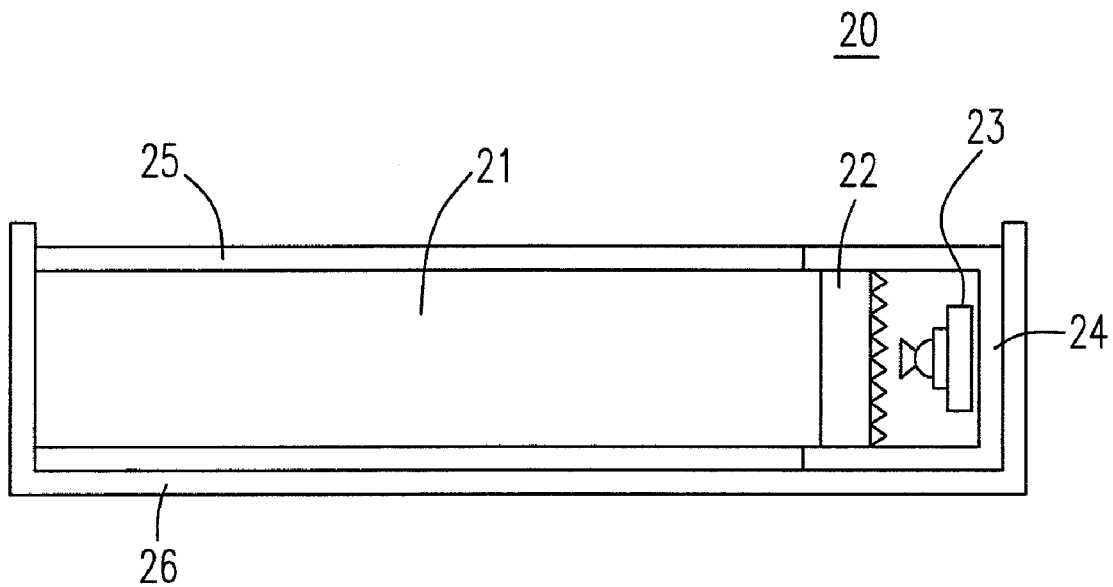
FIG. 2 shows a side cross-section diagram of the first preferred embodiment of the present invention.
Figure 3:
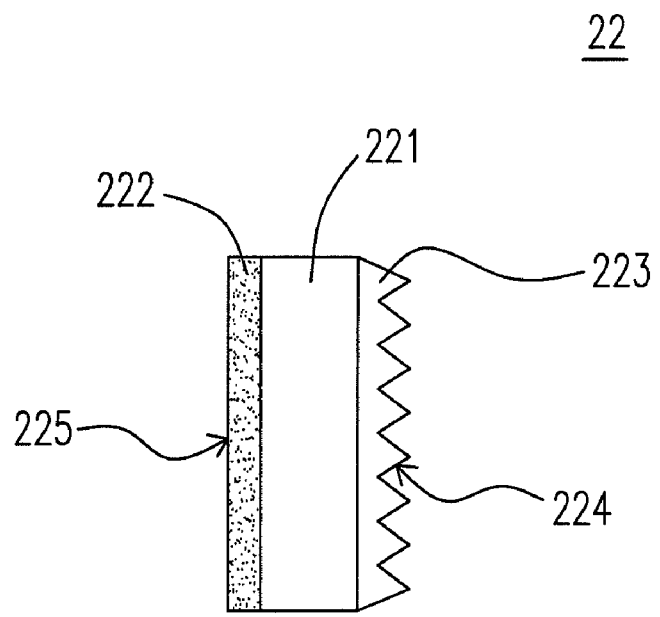
FIG. 3 is a diagram showing a mixing light guide plate of the first preferred embodiment of the present invention.

In order to more clearly understand the above objectives, features and advantages of the present invention, the following preferred embodiments in accordance with the appended figures of the present invention will be more clearly explained as follows:

Please refer to FIGS. 2 and 3. FIG. 2 shows a side cross-section diagram of the first preferred embodiment of the present invention. FIG. 3 is a detailed diagram showing a mixing light guide plate of the first preferred embodiment of the present invention. The backlight module 20 has a light guide plate 21, a mixing light guide plate 22, a plurality of light sources 23, a reflector 24, an optical film 25 and a frame 26. The pluralities of light sources 23 have the RGB tri-color LED, placed between the reflector 24 and the mixing light guide 22 and arranged in a row. The reflector 24 is composed of a reflective material having a reflective inner surface, which reflects the light emitted from the light sources 23 to the mixing light guide plate 22. Besides, the inner surface of the frame 26 has a reflective layer. The mixing light guide plate 22 is placed in a first side of the light guide plate 21. The primary tri-color red, green and blue lights from the plurality of light sources 23 enter the mixing light guide plate 22 through the incident surface 224 of the mixing light guide plate 22, mixing into the white light within the mixing guide plate 22. The mixing white light is emitted to the light guide plate 21 through the emitting surface 225 of the mixing light guide plate 22. Finally, the light guide plate 21 transforms the mixing white light from the mixing light guide plate 22 into the surface light source. The light guide plate can be a rectangular light guide plate or a wedge-shaped light guide plate. Please be noted that the mixing light guide plate 22 of the present invention is not a single material as that of prior art. The mixing light guide plate 22 is composed of the diaphanous sheet 222 which is transparent and having a foggy surface, the transparent sheet 221 and the uneven surface sheet 223 which is a transparent layer with an uneven surface, wherein the diaphanous sheet 222 is made of a ground glass or a diffractive component. The transparent sheet 221 includes a material being one selected from a group consisting of a polycarbonate, a cycloolefin copolymers (COC), a polymethyl-methacrylate and a combination thereof. The uneven surface sheet 223 includes a plurality of units having shapes being ones selected from a group consisting of zigzag shapes, waved shapes, shapes causing dark and bright bands and a combination thereof. The mixing white light of the mixing light guide plate 22 can be well mixed into an even surface light source. Since the mixing light guide plate 22 is composed of the diaphanous sheet 222 which is transparent and having a foggy surface, the transparent sheet 221 and the uneven surface sheet 223 having an uneven surface, wherein the refractive indexes of the diaphanous sheet 222, the transparent sheet 221 and the uneven surface sheet 223 are M1, M2 and M3 respectively. Due to the differences among the refractive indexes, when the RGB tri-color lights enter the mixing light guide plate 22, it will pass through the uneven surface sheet 223, the transparent sheet 221 and the diaphanous sheet 222 and have different degree of refraction according to their different refractive indexes.

According to the backlight module of the present invention, since the mixing light guide plate 22 is composed of the uneven surface sheet 223, the transparent sheet 221 and the diaphanous sheet 222, which have different refractive indexes. The primary tri-color red, green and blue lights can be refracted in the mixing light guide plate 22 to increase the probability of mixing the tri-color lights. The lights can take multiple refractions to change their directions and make the RGB tri-color lights fully mixed into white light through entering the uneven surface sheet 223, the transparent sheet 221 and the diaphanous sheet 222. Since the present invention has a good light mixing mechanism, which makes the light emitted from the LED backlight module with a uniform brightness and better color mixing effect.

Figure 4:
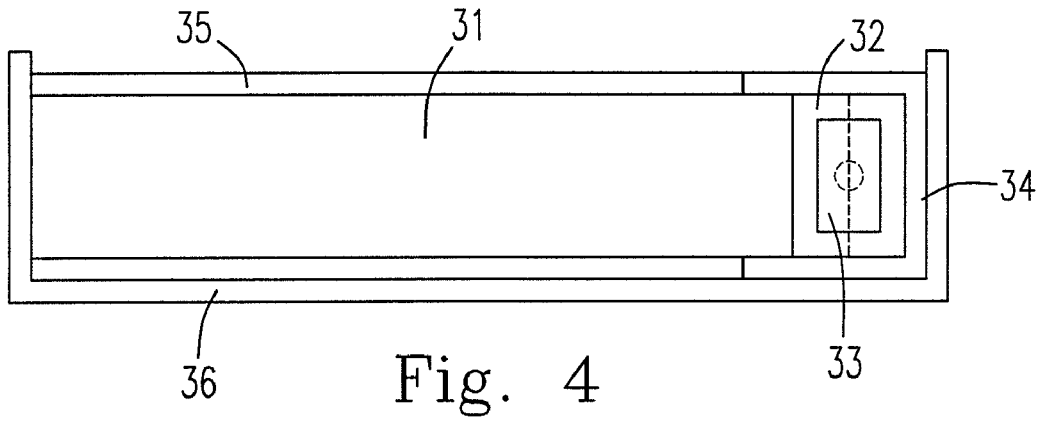
FIG. 4 shows a side cross-section diagram of the second preferred embodiment of the present invention.
Figure 5:
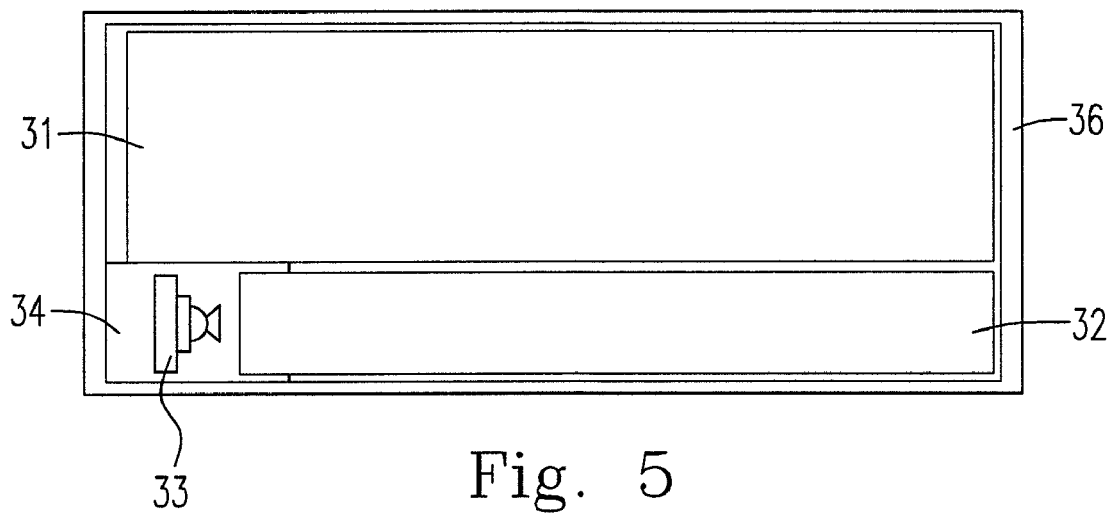
FIG. 5 is a top view diagram showing the second preferred embodiment of the present invention.
Figure 6:
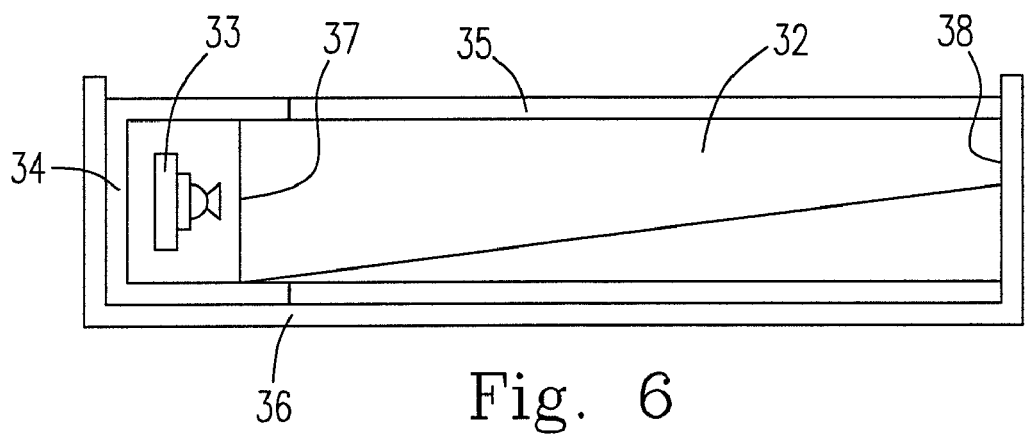
FIG. 6 shows another side cross-section diagram of the second preferred embodiment of the present invention.

Please refer to FIG. 4-6. FIG. 4 shows a side cross-section diagram of the second preferred embodiment of the present invention. FIG. 5 is a top view diagram showing the second preferred embodiment of the present invention. FIG. 6 shows another side cross-section diagram of the second preferred embodiment of the present invention. The frame 36 covers a first light source 33, a reflector 34, a first wedge-shaped light guide plate 32, a optical film 35 and a light guide plate 31. The inner surface of the frame 36 has a reflective layer. The first light source 33 including the RGB tri-color LED are set in the reflector 34 and set in the side of the first wedge-shaped light guide plate 32. The reflector 34 has a reflective inner surface, which will reflect the light emitted from the first light source 33 to the first wedge-shaped light guide plate 32. The first wedge-shaped light guide plate 32 placed on a first side of the light guide plate 31, having a second side 37 and a third side 38 and the area of the second side is greater than the area of the third side. In addition, the first side is substantially perpendicular to the second side and the third side. The first wedge-shaped light guide plate 32 is composed of the diaphanous sheet, the transparent sheet and the uneven surface sheet (not shown in figure), having different refractive indexes. Among them, the diaphanous sheet is against to the first side of the light guide plate 31. The uneven surface diaphanous sheet is installed at the second side 37 relatives to the light source. Since the diaphanous sheet, the diaphanous sheet and the uneven surface diaphanous sheet have different refractive indexes, the red, green and blue lights from the first light source 33 will be mixed to form the white light in the first wedge-shaped light guide plate 32. Due to the differences among the refractive indexes, when the RGB tri-color lights enter the mixing light guide plate 22, which will pass through the uneven surface sheet 223, the transparent sheet 221 and the diaphanous sheet 222 and refract according to different refractive indexes. Finally, the mixed white light from the first wedge-shaped light guide plate 32 will be transformed into the surface light source through the light guide plate 31.

Figure 7:
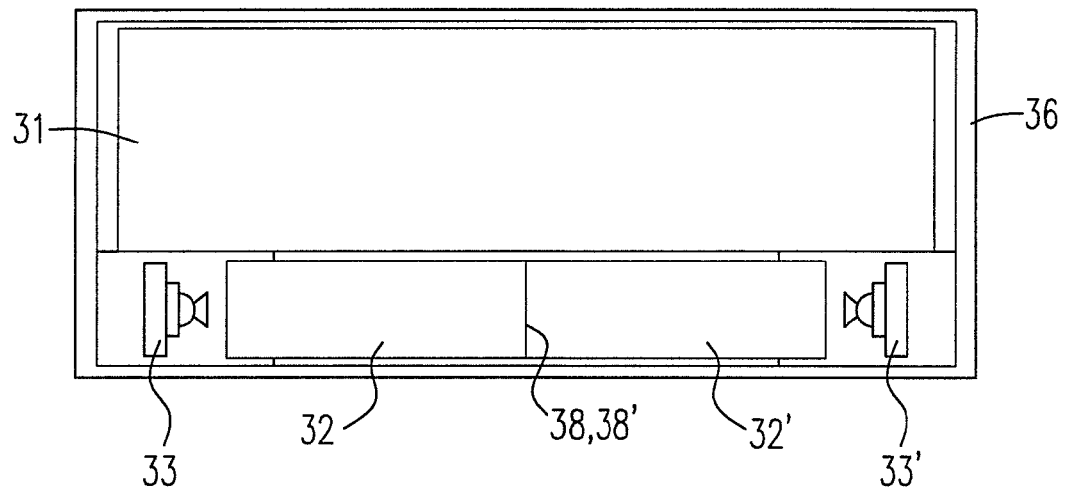
FIG. 7 is a top view diagram showing the third preferred embodiment of the present invention.
Figure 8:
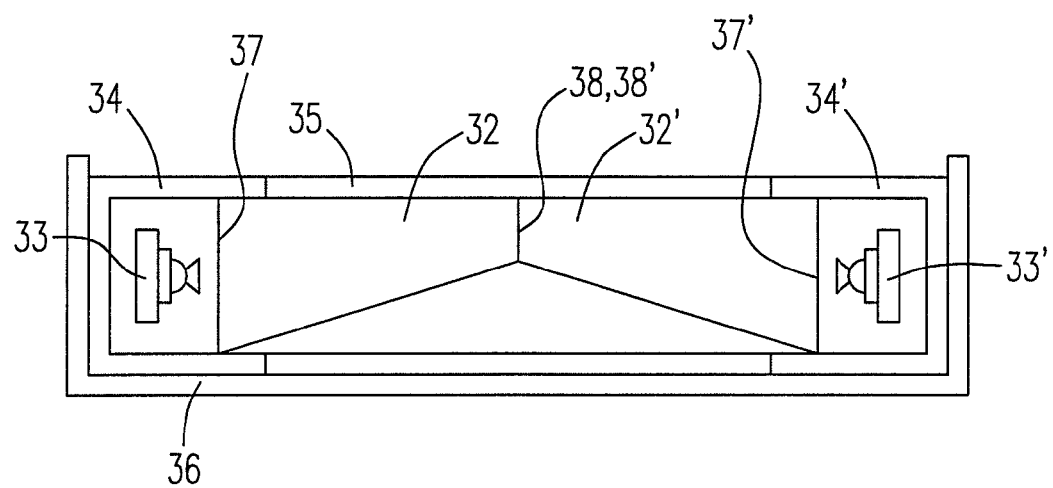
FIG. 8 shows another side cross-section diagram of the third preferred embodiment of the present invention.

Please refer to FIGS. 7 and 8. FIG. 7 is a top view diagram showing the third preferred embodiment of the present invention. FIG. 8 shows another side cross-section diagram of the third preferred embodiment of the present invention. The frame 36 encloses the first light source 33, the second light source 33', the reflector 34, the first wedge-shaped light guide plate 32, the second wedge-shaped light guide plate 32', the optical film 35 and the light guide plate 31. The inner surface of the frame 36 has a reflective layer. The first light source 33 and the second light source 33' including the RGB tri-color LED are set in the reflector 34. The reflector 34 has a reflective inner surface, which will reflect the light emitted from the first light source 33 and the second light source 33' to the first wedge-shaped light guide plate 32 and the second wedge-shaped light guide plate 32'. The first wedge-shaped light guide plate 32 and the second wedge-shaped light guide plate 32' placed on a first side of the light guide plate 31. The first wedge-shaped light guide plate 32 has a second side 37 and a third side 38 and substantially perpendicular to the first side of the light guide plate 31 and the area of the second side is greater than the area of the third side. The second wedge-shaped light guide plate 32' has a fourth side 38' and a fifth side 37' and substantially perpendicular to the first side of the light guide plate 31 and the area of the fifth side 37' is greater than the area of the fourth side 38'. Please refer to FIG. 8, the third side 38 of the first wedge-shaped light guide plate 32 is opposite to the fourth side 38' of the second wedge-shaped light guide plate 32' and the area of the third side is substantially equal to the area of the fourth side. Because the structures of the first wedge-shaped light guide plate 32 and the second wedge-shaped light guide plate 32' are the same as the wedge-shaped light guide plate of the second embodiment of the present invention, therefore, which will not be recited again. The first light source 33 is set in the second side 37 of the first wedge-shaped light guide plate 32. The second light source 33' is set in the fifth side 37' of the second wedge-shaped light guide plate 32'. The red, green and blue lights from both the first light source 33 and the second light source 33' are mixed into the white light within the first wedge-shaped light guide plate 32 and second wedge-shaped light guide plate 32'. Finally, the mixed white light from the first wedge-shaped light guide plate 32 and the second wedge-shaped light guide plate 32' will be transformed into the surface light source through the light guide plate 31.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A backlight module, comprising:
a light guide plate having a first side;
a mixing light guide plate composed of a diaphanous sheet, a transparent sheet and an uneven surface sheet and having an incident surface and an emitting surface and set on the first side of the light guide plate, wherein the transparent sheet is disposed between the diaphanous and the uneven surface sheet; and
a light source providing light entering into the incident surface, exiting from the emitting surface, and then entering into the light guide plate.

2. The backlight module of claim 1, wherein the incident surface is an uneven surface and the emitting surface is a foggy surface.

3. The backlight module of claim 2, wherein the foggy surface is a surface of the diaphanous sheet and the uneven surface is a surface of the uneven surface sheet.

4. The backlight module of claim 3, wherein the uneven surface comprises a plurality of units having shapes being ones selected from a group consisting of zigzag shapes, waved shapes, shapes causing dark and bright bands and a combination thereof.

5. The backlight module of claim 1, wherein the light guide plate has a cross-section being one of a wedge shape and a rectangular shape, and a material being one selected from a group consisting of a polydimethylsiloxan, a polyvinyl chloride, a polycarbonate, a polymethyl-methacrylate and a combination thereof.

6. The backlight module of claim 1, wherein the diaphanous sheet is made of one of a ground glass and a diffractive component.

7. The backlight module of claim 1, wherein the transparent sheet comprises a material being one selected from a group consisting of a polycarbonate, a cycloolefin copolymers (COC), a polymethyl-methacrylate and a combination thereof.

8. The backlight module of claim 1, further comprising a reflector within which the light source is placed.

9. The backlight module of claim 8, wherein the reflector is composed of a reflective material and has a reflective inner surface for reflecting the plurality of lights to the light mixing plate.

10. The backlight module of claim 1, further comprising a frame for containing the light guide plate, the mixing light guide plate, and the light source, wherein the frame comprises an inner surface having a reflective layer.

11. A backlight module, comprising:
a light guide apparatus;
a first mixing light guide plane;
a second mixing light guide plane;
a first light source providing light passing through the first mixing light guide plane; and
a second light source providing light passing through the second mixing light guide plane and entering into the light guide apparatus;
wherein the first mixing light guide plane and the second mixing light guide plane are disposed next to the light guide apparatus,
wherein one of the first mixing light guide plane and the second mixing light guide plane is composed of a diaphanous sheet, a transparent sheet and an uneven surface sheet.

12. The backlight module of claim 11, wherein the light guide apparatus has a first side surface, the first mixing light guide plane has a second and a third side surfaces and substantially perpendicular to the first side surface of the light guide apparatus.

13. The backlight module of claim 11 further comprising a reflector configured around the light source and having a reflective inner surface reflecting the light to the first and second mixing light guide plane.

14. The backlight module of claim 12, wherein the second mixing light guide plane has a fourth and a fifth side surfaces and substantially perpendicular to the first side surface of the light guide apparatus.

15. The backlight module of claim 14, wherein an area of the fourth side surface is substantially equal to an area of the third side surface.

* * * * *